Figure 1:
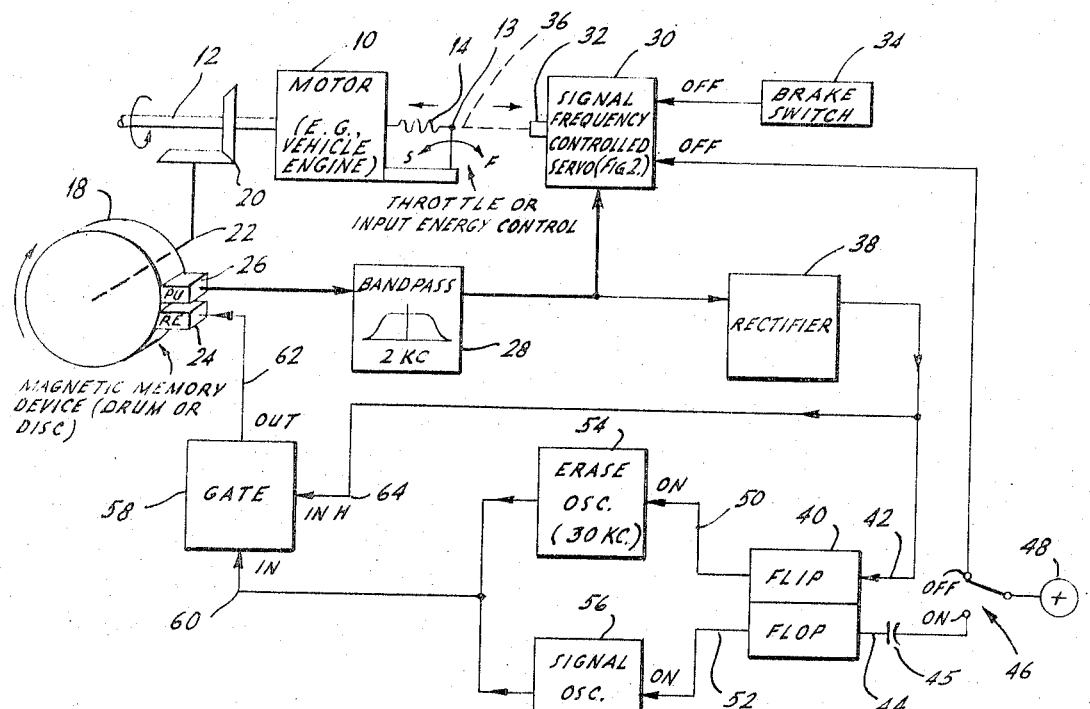

Sept. 12, 1967  A. HOPENGARTEN  3,340,950
MOTOR AND MOTOR VEHICLE SPEED MAINTAINING SYSTEM
USING RECORDED SIGNAL SERVO CONTROL
Filed April 8, 1965

MAGNETIC STORAGE SPEED CONTROL SYSTEM

SIGNAL FREQUENCY CONTROLLED SERVO 30
OF FIG. 1.

INVENTOR.
ALBERT HOPENGARTEN
BY D.P. Pressman
ATTORNEY

United States Patent Office 3,340,950
Patented Sept. 12, 1967

3,340,950
MOTOR AND MOTOR VEHICLE SPEED MAINTAINING SYSTEM USING RECORDED SIGNAL SERVO CONTROL
Albert Hopengarten, Lafayette Hills, Pa., assignor to Philco-Ford Corporation, a corporation of Delaware
Filed Apr. 8, 1965, Ser. No. 446,629
17 Claims. (Cl. 180—105)

This invention relates to a speed control system and in particular to a system for automatically maintaining the speed of a motor or motor vehicle substantially at any desired value. Although the present system will be discussed, for purposes of providing a suitable example, with reference to its application as a motor vehicle speed control device, it will be understood that the present system is by no means limited to this application but finds utility in any application falling within the ambit of the appended claims.

The advantages of automatic speed control devices for motor vehicles have long been manifest. Such devices are highly useful in long distance or turnpike road travel where a driver must maintain a set speed for long periods of time. The foot which is used to control the accelerator is easily fatigued, and, in addition, the driver may be mentally fatigued by constantly adjusting the position of the accelerator to compensate for varying load factors such as road level, wind, and atmospheric conditions. Manual dashboard "throttle" controls, which are arranged to hold the throttle opening at fixed setting, have been utilized, but these controls are obviously unsuited to compensate for the various load factors aforedescribed.

Recently automatic throttle controls have made their appearance—these controls being arranged to maintain the speed of an automobile substantially constant despite variations in load conditions. These devices, in addition to relieving driver fatigue, provide the additional advantage of greater gas economy. This is because these devices inherently provide gradual acceleration and deceleration of engine speed under variable load conditions.

A brief review of prior art automatic speed control devices is found in the periodical, "Car Life," for October 1964, pages 69 to 72. The principal disadvantages of prior art devices are those of (1) inaccuracy, (2) complexity and hence lack of reliability, and (3) excessive cost. The devices are inaccurate because the speed which is desired to be maintained must be set on an auxiliary dashboard dial which may not correspond exactly to the main speedometer dial. In addition inaccuracies are found due to a "hunting" action which is often inherent in the operation of these devices. The complexity of these devices is illustrated by the diagrams on pages 70 to 72 of the aforementioned "Car Life" article. It is desirable that a speed control device have a useful life at least as long as that of the automobile to which it is attached, say 100,000 miles or 10 years. It is highly unlikely that devices of the complexity heretofore extant will have a repair free life of this length. In addition, the complexity of these devices also adds to their initial cost, both for materials and for installation.

Other disadvantages are also found with these prior art devices. Certain devices cannot be attached directly to an existing automobile without extensive modfication thereof or substitution of components such as speedometers and throttle mechanisms. The operation of these devices is driver-distracting in that the driver must take his eyes from the road in order to set the speed control dial of these devices to the speed at which it is desired to cruise. Certain prior art devices require special rotary air pumps or special electric motors which are inherently highly undesirable.

OBJECTS

It is an object of the present invention to overcome these and other disadvantages of these prior art devices. More specifically, several objects of the present invention are: (1) To provide an automatic speed control device which is simple in design and operation, reliable, and inexpensive; (2) To provide a speed control device which has high tracking accuracy and which results in little or no hunting; (3) To provide a speed control device which does not require auxiliary dials or pointers; (4) To provide a speed control device which does not require complicated auxiliary power mechanisms and in which mechanical components are kept to a minimum.

Further objects and advantages of the present invention will become apparent from a consideration of the ensuing description thereof.

SUMMARY

According to the present invention a member carrying a circular magnetic track is coupled to the motor (or motor vehicle) whose speed is to be controlled. A signal of a predetermined frequency is recorded on the magnetic track when the motor is rotating at the speed desired to be maintained. A pickup head is coupled to the magnetic track to translate the signal recorded on the track into electrical form, the frequency of this electrical signal being proportional to the actual speed of the member. Means are provided for controlling the energy supplied to the motor in inverse proportion to the frequency of the signal supplied by the pickup head.

DRAWING

FIG. 1 of the drawings shows a magnetic storage speed control system according to the present invention.

Figure 2:
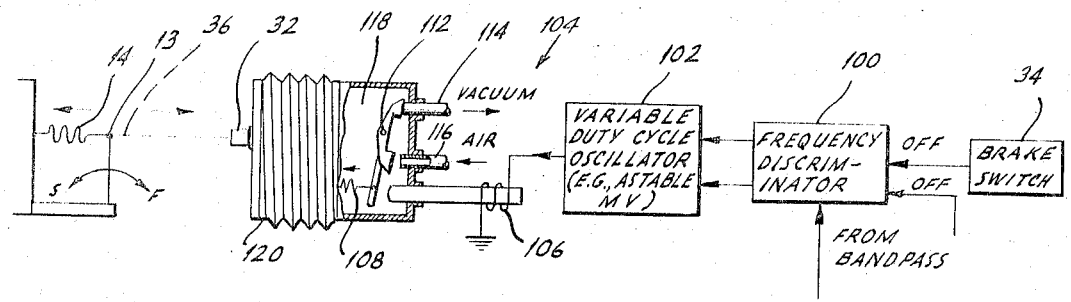

FIG. 2 of the drawings shows an exemplary signal frequency controlled servomechanism used in the system of FIG. 1.

FIG. 1—*Description of system*

FIG. 1 shows a magnetic storage speed control system according to the present invention. The components in FIG. 1 are depicted generally block diagram form.

MOTOR 10 represents a device for converting energy of a type other than rotational to rotational energy. Motor 10 may be an electrical motor, a gasoline or diesel engine, a steam engine, a air engine, a turbine engine, or any other type of motor. Motor 10 has an output shaft 12 which is connected to a load to be driven. In the case of an automobile engine, shaft 12 may represent any member whose rotational speed is controlled by the speed of motor 10, e.g., the automobile's drive shaft, the crank shaft of the motor, or even an axle or wheel of the automobile. Shaft 12 is the member whose rotational speed is maintained automatically at a substantially fixed value according to the present invention. Motor 10 also has a throttle or input energy control means which is represented in symbolic form at 13. Throttle 13 is biased toward the slow position (S) by means such as spring 14. The slow position is the position at which less energy is supplied to motor 10. Throttle 13 may represent, for example, an electronically or manually operated input energy control for an electrical motor, the butterfly valve in the carburector of a gasoline engine, or any other means or member whose physical position can control the energy supplied to motor 10 to maintain its speed constant under varying load conditions.

MAGNETIC MEMORY DEVICE 18 comprises a magnetic memory drum or disc or any other type of magnetic storage means which includes an endless magnetic track upon which electrical signals can be recorded in the manner in which tape recordings are presently made, for example. Memory device 18 is connected mechanically to shaft 12 so that the speed of the magnetic memory track on device 18 will be proportional to the speed of shaft 12. A suitable means for doing this comprises gear wheels 20 and connecting shafting 22.

In an automobile a convenient way of driving magnetic memory device 18 at a speed proportional to the speed of the automobile is to connect device 18 to the speedometer cabel socket at the fly wheel or transmission of the automobile. Device 18 can be included within a housing which can be screwed into the speedometer cable socket so that device 18 is driven instead of the speedometer cable. A suitable socket may be provided on the housing for device 18 to receive the speedometer cable. In this way the speed control device of the present invention can be installed easily in any existing automobile without costly modifications or component replacements by interposing it between the speedometer cable and its socket.

Magnetic memory device 18 has a record/erase head 24 and a pickup head 26 magnetically coupled to the magnetic track at adjacent locations on this track. When an electrical signal is supplied thereto, record/erase head 24 is arranged to magnetize the track of device 18 in accordance with said signal. Pickup head 26 is arranged to reproduce the electrical signal which is recorded on the track of device 18.

The electrical components in the diagram of FIG. 1 will now be described. Amplifiers have been omitted from said diagram and the following discussion in order to simplify the same since it is well known to those skilled in the art to provide suitable amplification where required in an electrical system. It will be understood that the components represented in block form in FIG. 1 usually will be combined into a single electrical circuit rather than existing as discrete units as shown. Further, the functions of several of the represented blocks may be combined in a single stage in said circuit.

BANDPASS circuit 28 has an input connected to the output of pickup head 26 and has a single output. Bandpass circuit 28 is arranged to pass signals of a predetermined frequency (e.g., 2 kc.) and all signals having a frequency differing from this predetermined frequency by not more than a predetermined amount, as will be discussed later. Bandpass circuit 28 is not an essential component of applicant's basic invention, as will be discussed more fully below, but is used in applications, such as automotive speed control, wherein control operation within a preselected range only is desired. In practice bandpass circuit 28 may not exist as a discrete filter; its function may be inherent in the operation and construction of the next-described component.

SIGNAL FREQUENCY CONTROLLED SERVOMECHANISM 30 receives an electrical input signal from bandpass circuit 28 and has an output member 32 whose physical position is adjusted according to the frequency of this input signal. In the example given, higher frequency input signals will cause member 32 to move to the left and lower frequency input signals will cause member 32 to move to the right. Servomechanism 30 has a variable set point, i.e., member 32 can be set to any desired initial position which will be maintained by a given frequency input signal and will be adjusted to the left or right if the frequency of this signal increases or decreases, respectively. Member 32 is connected mechanically via linkage 36 to throttle or input energy control member 13. Servo 30 also receives inputs from brake switch 34 and control switch 46, which, along with circuit 28, are preferably included in an automotive speed control, but which are not essential components in applicant's basic invention. An input from brake switch 34 or control switch 46 will disable servo 30 so that the position of member 32 will be dictated by its external load, e.g., that of throttle spring 14.

Any type of device which will adjust the physical position of an output member in accordance with the frequency of an electrical input signal may be used for servo 30. One such system is shown in FIG. 2 of the drawing, which will be discussed below. However many other types of signal frequency controlled servomechanisms with variable set points will be visualized by those skilled in the art. Accordingly, the scope of the present invention is not limited to the apparatus shown in FIG. 2, except as required by the appended claims. The system thus far described, with the exception of circuit 28, brake switch 34, and control switch 46 forms the basic feedback speed control system of applicant's invention. The following components, together with bandpass circuit 28 and brake switch 34 are useful in automotive and certain other practical applications of the present invention.

RECTIFIER circuit 38 is arranged to rectify the signal supplied by bandpass circuit 28. Rectifier circuit 38 may optionally include low pass filtering if it is desired that the output signal therefrom have a smooth rather than pulsating form. Circuit 38 may be omitted entirely if the circuits to which its output is connected do not require a direct current signal for their operation.

FLIP-FLOP 40 represents a standard bistable circuit having two stable states. Flip-flop 40 is not limited to a conventional cross coupled bistable multivibrator configuration but may comprise as well a bistable relay or bistable silicon controlled rectifier circuit. Flip-flop 40 receives inputs 42 and 44 from rectifier 38 and from SPDT switch 46, respectively and has outputs 50 and 52. The operation of flip-flop 40 is such that when input 42 is energized, output 50 will be energized. When the lower input 44 of flip-flop 40 is energized momentarily, lead 52 will become energized and lead 50 will be deenergized. When switch 46 is thrown to the ON position, a voltage pulse from battery 48 will be applied to input 44 via differentiating capacitor 45. This will cause output 50 to be deenergized and output 52 to be energized. (A lead is "energized" in the sense employed herein when its voltage is such as will actuate a succeeding stage or circuit, whether the voltage be positive, negative, or even zero volts.)

ERASE OSCILLATOR 54 is arranged to supply a signal which, when applied to lead 24, will "erase" any information stored in the memory of device 18. As will be understood by those skilled in the magnetic recording art, this "erase" operation may be merely the act of recording a signal on said memory track which is higher than the maximum frequency capable of being stored on the track, or which is higher than the maximum frequency utilizable by the readout circuitry connected to the pickup head coupled to said track. In one exemplary embodiment of the present invention erase oscillator 54 was arranged to supply a signal having a frequency of 30-kHz. and an amplitude sufficient to destroy information previously recorded in the memory track of device 18. Erase oscillator 54 is arranged to supply its erase signal only when input 50 thereof is energized.

SIGNAL OSCILLATOR 56 is arranged to supply a signal of a fixed frequency within the passband of circuit 28, if present, which can be recorded on the memory track of drum 18. Signal oscillator 56 is arranged to be turned on when input lead 52 thereto is energized. In one exemplary embodiment of the present invention, oscillator 56 was arranged to supply a signal having a frequency of 2-kHz.

GATE 58 will normally transmit signals applied to its input lead 60 to its output lead 62, which is connected to record erase head 24, but this gate will be nontransmissive when inhibit lead 64 thereof is energized. Input lead 60 is connected in common to the outputs of erase oscillator 54 and signal oscillator 56. Inhibit lead 64 is connected to the output of rectifier 38.

*FIG. 1—Operation of system*

The operation of the system of FIG. 1 will be described with reference to an automotive speed control application.

It will be assumed that magnetic memory device 18 is suitably connected to the drive shaft of the motor vehicle to be controlled, and that motor 10 represents the vehicle's engine and member 13 represents the throttle thereof.

Initially switch 48 will be in the OFF position and the output 50 of flip flop 40 will be energized. Erase oscillator 54 will supply a 30-kHz. signal through normally transmissive gate 58 to record/erase head 34 to maintain the memory track of device 18 in an erased condition.

When the automobile is traveling at the speed the driver wishes to maintain, say 50 miles per hour, the driver will throw switch 46 to the ON position, causing output lead 52 of flip flop 40 to energize signal oscillator 56. Oscillator 56 will supply a 2-kHz. signal through gate 58 (which is normally transmissive) to lead 62 and to record/erase head 24. As device 18 rotates, the 2-kHz. signal from oscillator 56 is recorded on the circular endless track thereof. It will be apparent that the spacing along the memory track at which peaks of like polarity are recorded, i.e., the wavelength of the signal recorded on the memory track of device 18, will be inversely proportional to the actual speed of the automobile and hence device 18 during recording. Thus the faster the automobile's speed, the greater will be the wavelength of the recorded signal. The speed of device 18 is such that many such wavelengths are recorded in a single revolution.

After device 18 completes almost one full revolution after the inception of recording, pickup head 26 will begin to sense the 2-kHz. signal recorded on the memory track and will supply said signal to bandpass circuit 28 and thence to rectifier 38. A direct current signal will be supplied by rectifier 38 to leads 42 and 64. Accordingly, gate 58 will be rendered nontransmissive and recording of the 2-kHz. signal on memory track 18 will terminate. Heads 24 and 26 should be separated at a distance such that at normal cruising speeds (e.g., 40 to 80 miles per hour) the signal supplied by oscillator 56 will have been recorded on substantially the entire length of the memory track of device 18 just as gate 58 is rendered nontransmissive by the output of rectifier 38. The input to lead 42 of flip flop 40 from rectifier 38 will switch the state of flip flop 40, deenergizing output lead 52 thereof and energizing output lead 50 to reactivate erase oscillator 54. However the signal from erase oscillator 54 will be prevented from reaching record/erase head 24 by gate 58, which is held in its nontransmissive state by the output from rectifier 38.

The 2-kHz. output signal from bandpass circuit 28 will also be supplied to servo 30, which will adjust the previously set position of control member 32 according to the frequency of the signal supplied by pickup head 26. Pickup head 26, servo 30, and motor 10, and the interconnections between these components will form a closed negative-feedback control loop which maintains the speed of motor 10 substantially constant despite varying load conditions. For instance, assume that the speed control is set and the automobile proceeds from a level road onto a hill. The speed of the automobile and hence shaft 12 and drum 18 will slow down slightly under the increased load. This will cause the frequency of the signal supplied by pickup head 26 to decrease slightly. Servo 30 will sense this decrease in frequency and move throttle member 13 toward the fast (F) position so that motor 10 will supply more energy to resist the change in speed caused by the load of the hill.

The automatic speed control function is easily disabled if desired. For instance, assume that a momentary burst of speed is required in order to pass another car on the same road traveling in the same direction. The driver will depress the accelerator of the automobile to override the force of spring 14 and move throttle member 13 toward the fast position. As soon as the car speed increases so that the signal supplied by pickup head 26 to bandpass circuit 28 is beyond the upper bandpass of this circuit, no further signal will be supplied to servo 30 and hence the control function will cease. The output of rectifier 38 will also terminate and gate 58 will be rendered transmissive, allowing the signal from erase oscillator 54 to erase the 2-kHz. signal which was recorded in device 18. When the desired normal cruising speed is resumed, switch 46 is thrown to the OFF and back to the ON position, allowing the speed control function to be resumed. Alternatively, a separate reset switch can be provided by also connecting a SPST momentary contact type switch between source 48 and capacitor 45.

The upper cutoff frequency of circuit 28 can be adjusted as desired, according to the desired excess speed at which the control function is to cease. Alternatively a high pass filter can be substituted for bandpass filter 28, in which case the automatic control function will cause the previously set speed to be resumed automatically when the driver's foot is removed from the accelerator.

Assume next that it is desired to slow down the automobile, say when meeting an obstruction in the road. In this case the driver will depress the foot brake. Brake switch 34 will energize the OFF input of servo 30. (To this end brake switch 34 may represent merely an electrical connection to the output of a hydraulically operated brake-light switch.) As soon as the OFF input of servo 30 is energized, its control function will cease, and spring 14 will urge throttle member 13 to the slow position. As the speed of the automobile decreases, the frequency of the control signal supplied by pickup head 26 will decrease. When the frequency of the control signal falls below the lower cutoff of the bandpass of circuit 28, rectifier 38 will cease to provide an output and gate 58 will be rendered transmissive, allowing the signal supplied by erase oscillator 54 to erase the information previously stored on the track of memory device 18. Thereafter when operating speed is resumed, switch 46 may be thrown OFF and back ON to pulse input 44 of flip flop 40 so that the control function will be resumed.

If it is desired to slow down only slightly, for example when passing an obstruction in the road, the foot brake will again be depressed, actuating brake switch 34 and causing the control function of the system to cease temporarily. If the automobile's speed is not decreased sufficiently to cause the frequency of the signal supplied by pickup head 26 to fall below the lower cutoff of bandpass circuit 28, rectifier 38 will continue to provide an output, maintaining gate 58 nontransmissive. Accordingly, the erase signal from oscillator 54 will never be supplied the the record erase head 24. Thus when the brake is released the control function will be resumed automatically and the car will automatically resume the speed determined by the wavelength of the signal previously recorded on the track of memory device 18.

It will be appreciated that if, while cruising, it is desired to change to a new controlled cruising speed within the range of bandpass filter 28, or if bandpass filter 28 is eliminated, or if a low or high pass filter is substituted therefor and it is desired to change to a new controlled cruising speed, that merely flipping switch 46 to OFF and back to ON will be insufficient. This is because input 64 of gate 58 will remain energized when the vehicle reaches the new speed and the signal recorded on memory device 18 will not be erased by the 30-kHz. signal from oscillator 54. Means can be included for changing the controlled cruising speed under these circumstances by providing a momentary contact type single-pole-single-throw (SPST) switch in series with lead 64. When it is desired to change speed, this switch can be depressed, opening lead 64 and allowing gate 58 to be rendered transmissive. The erase signal from oscillator 54 will erase the signal previously stored on the magnetic memory device. When the new desired speed is reached, switch 46 can be thrown OFF and back ON so that a new 2-kHz. signal of appropriate wavelength will be recorded on the memory track of device 18 and a new controlled speed operation will be initiated.

It will be appreciated that a great advantage of the present invention is the fact that no separate calibrated speed dials, which may not correspond to the speedometer, or to the actual speed of the automobile, are required. The speed control is operated merely by flipping a switch when the car has reached the desired speed. Control will be terminated automatically if the car's actual speed is changed by a predetermined amount.

FIG. 2.—*Description of exemplary servo*

The components shown in FIG. 2 represent one form of device which may be used for servo 30 of FIG. 1. The components include the following units.

FREQUENCY DISCRIMINATOR 100 is arranged to receive the signal from bandpass circuit 28 and provide one or more output signals whose amplitudes are proportional to the frequency of the input signal thereto. Frequency discriminators are well known in the art and will not be described in detail. Discriminator 100 may be tuned to the frequency of the signal supplied by oscillator 56 and may have two output terminals, one arranged to supply a greater voltage for positive frequency deviations and the other arranged to supply a greater voltage for negative frequency deviations. In this case bandpass circuit 28 and rectifier 38 can be omitted, an output of discriminator 100 being connected also to leads 42 and 64.

VARIABLE DUTY CYCLE OSCILLATOR 102 is connected to the output of discriminator 100 and is arranged to supply a low frequency signal (e.g., 20 to 30-kHz.) whose duty cycle is controlled by the output signal from discriminator 100. Oscillator 102 may comprise an astable multivibrator consisting of two cross-coupled transistor inverters whose bases are connected to the respective outputs of discriminator 100. In this case positive frequency deviations of the input signal to discriminator 100 will lengthen the "on" time of one side of the multivibrator and negative frequency deviations the "on" time of the other side. Other types of variable duty cycle oscillators are well known in the art, being illustrated, for example, in Patent 3,076,152, granted Jan. 29, 1963, to Baird et al.; in chapter 13 of volume 19 of the Radiation Laboratory Series (McGraw-Hill); and also at page 30 of Electronic Design for Jan. 20, 1960.

A suitable circuit for discriminator 100 and oscillator 102 is also disclosed in the copending application of Richard F. Wood, Ser. No. 489,215, filed Sept. 22, 1965, and assigned to the assignee of the present application.

LINEAR MOTOR 104 is connected to the output of oscillator 102. Motor 104 is arranged to adjust the position of member 32, which is connected to throttle member 13 of FIG. 1, according to the value of the duty cycle of the signal supplied by oscillator 102. For example, when oscillator 102 supplies signals having a greater duty cycle, motor 104 will adjust the position of member 32 to the right, causing speed control member 13 to be moved toward the fast position.

Linear vacuum motors such as 104 are well known in the art (see, e.g., speed control valve assembly 112 in Patent 3,088,538) and will not be described in detail. In general, linear motor 104 operates as follows: the pulsating output from oscillator 102 flows through coil 106, creating a magnetic field, which in conjunction with spring member 108, causes armature member 112 to oscillate in narrow arc about its pivot. When coil 106 is not pulsed, spring 108 will urge member 112 to the position shown wherein vacuum port 114 is closed. When coil 106 is pulsed, armature 112 will rotate slightly counterclockwise, opening vacuum port 114 and closing atmospheric port 116. It will be apparent that the proportion of time vacuum port 114 is opened will be determined by the duty cycle of the signal supply from oscillator 102. Accordingly the pressure in chamber 118 and hence the position of bellows 120 will be determined by the duty cycle of said signal. After being set, the position of member 32 will thus be adjustable according to the degree of vacuum in chamber 118. It will thus be apparent that the position of member 32 and hence throttle member 13 will in fact be adjusted by the frequency of the signal supplied from pickup head 26.

The OFF inputs to discriminator 100 may be arranged to disconnect the input thereto from bandpass circuit 28 by means of a gate, or may be arranged to bias any element in discriminator 100 to a nonoperative state. Said OFF inputs may alternatively be connected elsewhere in the system of FIG. 2, as will be apparent to those skilled in the art.

While there has been described what is at present considered to be the preferred embodiment of the invention it will be apparent that various modifications and other embodiments thereof will occur to those skilled in the art within the scope of the invention. Accordingly, it is desired that the scope of the invention be limited by the appended claims only.

I claim:

1. A motor vehicle speed maintaining system, comprising, in combination:
   (a) a motor vehicle including a rotational motor having an output shaft arranged to propel said motor vehicle, said motor having an input energy control means,
   (b) first means for receiving an electrical signal and adjusting said energy control means in accordance with the frequency of said signal,
   (c) an endless magnetic memory track connected to the drive train of said motor vehicle such that said track is moved past a fixed point at a speed proportional to the speed of said motor vehicle,
   (d) means for recording an electrical signal of a given frequency on said track such that the wavelength of the signal recorded is inversely proportional to the speed of said track and hence said motor vehicle during recording, and
   (e) means for reproducing the signal recorded on said track in electrical form and supplying said signal to said first means, the frequency of the signal reproduced being proportional to the speed of said track during reproduction, whereby the speed of said motor vehicle will be maintained substantially the same as its speed during said recording.

2. The apparatus of claim 1 wherein said means for controlling said energy control means comprises a frequency discriminator arranged to receive said signal, an astable multivibrator connected to the output of said discriminator, the duty cycle of the output signal from said multivibrator being controlled by the amplitude of the output signal of said discriminator, and a linear vacuum motor arranged to control the position of said energy control member in response to the output of said multivibrator.

3. A motor vehicle speed maintaining system, comprising, in combination:
   (a) magnetic storage means including an endless magnetizable track,
   (b) a motor vehicle including a rotational motor arranged to propel said vehicle, said magnetic storage means being coupled to the drive train of said motor vehicle for moving said endless magnetizable track at a rate of speed proportional to the speed of said motor vehicle, said motor including an input energy control means,
   (c) first means for recording a signal of a given frequency on said magnetic track such that the wavelength of the signal recorded on said track is inversely proportional to the speed of said track and hence said motor vehicle, (d) second means for reproducing the signal recorded on said magnetic track such that the frequency of said reproduced signal varies in proportion to the speed of said track and hence said motor vehicle, and (e) third means for adjusting said energy control means in accordance with the frequency of said reproduced signal such that less energy will be supplied to said motor when the frequency of said reproduced signal increases, whereby the speed of said motor vehicle will be maintained substantially the same as its speed during said recording.

4. The apparatus of claim 3 wherein said first means comprises an oscillator, a magnetic recording head coupled to said oscillator electrically and to said track magnetically, a pickup head coupled to said track magnetically, and means coupled to said pickup head for electrically disconnecting said oscillator from said recording head in response to reception of a signal from said pickup head.

5. The apparatus of claim 4 wherein said means coupled to said pickup head comprises a bandpass amplifier, a detector, and a gate.

6. A motor vehicle speed maintaining system, comprising, in combination:
(a) a motor vehicle including a rotational motor arranged to propel said motor vehicle, said motor including an input energy control member,
(b) first means for adjusting the position of said member in accordance with the frequency of an electrical signal supplied thereto,
(c) magnetic memory means including an endless magnetic track connected to the drive train of said motor vehicle and arranged to be rotated at a speed proportional to the speed of said motor vehicle,
(d) second means for recording an electrical signal of a given frequency in said magnetic memory means, the wavelength of said signal recorded being proportional to the speed of said track and hence said motor vehicle during recording, and
(e) third means for: (1) converting the signal stored in said magnetic memory means to an electrical form utilizable by said second means, and (2) supplying said electrical signal to said first means, whereby the speed of said motor vehicle will be maintained substantially the same as its speed during said recording.

7. The apparatus of claim 6 wherein said first means comprises: (1) means for producing an output signal of amplitude proportional to the frequency of an input signal supplied thereto, and (2) means for adjusting the position of said member in accordance with the amplitude of said output signal.

8. The apparatus of claim 6 wherein said magnetic memory means comprises an endless magnetizable track, and further including means for disconnecting said third means from said magnetic memory when said signal of said given frequency is stored on the entire portion of said track.

9. A motor vehicle speed maintaining system, comprising, in combination:
(a) a motor vehicle including a variable speed motor arranged to rotate a shaft connected to propel said motor vehicle, said motor including an input energy control member,
(b) a magnetic memory device comprising a circular magnetic track connected to the drive train of said motor vehicle so as to be rotated at a speed proportional to the speed of said motor vehicle,
(c) means for recording an electrical signal of a given frequency on said track such that the wavelength of the signal recorded is inversely proportional to the rotational speed of said track and hence said motor vehicle during recording, (d) means for reproducing the signal recorded on said track in electrical form, such that the frequency of the signal reproduced is proportional to the rotational speed of said track and hence said motor vehicle during said reproduction, and
(e) means for adjusting the position of said member in accordance with the frequency of said reproduced signal, whereby the speed of said motor vehicle will be maintained substantially the same as its speed during said recording.

10. The apparatus of claim 9 wherein said means for recording comprises an oscillator, an electrical-to-magnetic transducer arranged to receive the output signal from said oscillator, and means for terminating transmission of said output signal to said oscillator when said signal is fully recorded on said magnetic track.

11. The apparatus of claim 9 wherein said means for adjusting the position of said member comprises means for providing a signal having an amplitude proportional to the frequency of said reproduced signal, and means for controlling the position of said member according to the amplitude of said signal.

12. The apparatus of claim 11 wherein said means for adjusting the position of said member comprises an astable multivibrator arranged to supply an output signal whose duty cycle is controlled by the magnitude of said direct current component and a linear vacuum motor arranged to adjust the position of said throttle member according to the duty cycle of the output signal of said multivibrator.

13. A motor speed control system, comprising, in combination:
(a) a motor including an output shaft and an input energy control member for controlling energy supplied to said motor according to the position of said member,
(b) first means for adjusting the position of said member according to the frequency of an electrical signal supplied thereto,
(c) magnetic memory means having a circular magnetic track, said track connected to said output shaft and arranged to be rotated at a speed proportional to the speed of said shaft,
(d) second means for supplying an erase signal,
(e) third means for supplying a signal of a frequency different from the frequency of said erase signal and capable of being recorded on said magnetic track,
(f) fourth means for alternatively actuating said second means or said third means,
(g) a recording head magnetically coupled to said track,
(h) gating means for selectively coupling the outputs of said second and said third means to said recording head,
(i) a pickup head magnetically coupled to said track,
(j) fifth means coupled to the output of said pickup head and arranged to pass at least the frequency of said third means but not said erase frequency, and
(k) sixth means for rendering said gating means nontransmissive in response to an output from said fifth means.

14. The apparatus of claim 13 wherein said sixth means is also arranged to set said fourth means to actuate said second means and wherein means are provided for setting said fourth means to actuate said third means.

15. A motor vehicle speed maintaining system, comprising, in combination:
(a) an engine arranged to propel said motor vehicle, said engine having a throttle arranged to control the fuel supply of said engine,
(b) magnetic memory means including an endless magnetic track and means for moving said track at a speed proportional to the speed of said vehicle,
(c) means for selectively recording an electrical signal of a given frequency on said track when said vehicle is moving such that the wavelength on said track of the signal recorded is inversely proportional to the speed of said vehicle, (d) a pickup head for converting the signal recorded on said track to an electrical signal whose frequency is proportional to the speed of said vehicle, (e) means for adjusting the position of said throttle according to the frequency of said electrical signal such that the amount of fuel supplied to said engine is inversely proportional to the frequency of said electrical signal.

16. The system of claim 15 wherein said means for controlling comprises a frequency discriminator arranged to receive said electrical signal, an oscillator arranged to supply an output signal having a variable duty cycle controlled by the output of said discriminator, and a linear vacuum motor arranged to adjust the position of said throttle according to the duty cycle of the output signal from said oscillator.

17. The system of claim 15 wherein said means for recording comprises an oscillator, a recording head coupled to said oscillator and said track, a pickup head coupled to said track, a bandpass circuit coupled to said pickup head, a rectifier coupled to said bandpass circuit, and a gate for disconnecting said oscillator from said recording head in response to an output from said rectifier.

References Cited

UNITED STATES PATENTS

| | | | |
|---|---|---|---|
| 2,576,424 | 11/1951 | Sunstein. | |
| 2,661,070 | 12/1953 | Ferrill | 180—82.1 |
| 2,768,331 | 10/1956 | Cetrone | 318—318 X |
| 2,783,426 | 2/1957 | Pittman | 318—314 |
| 2,828,459 | 3/1958 | Pear | 318—162 X |
| 2,886,757 | 2/1959 | Johnson | 318—314 X |
| 2,932,778 | 4/1960 | Curtis | 318—318 X |
| 3,088,538 | 5/1963 | Brennan et al. | 180—82.1 |

KENNETH H. BETTS, *Primary Examiner.*